(12) United States Patent
Göktekin

(10) Patent No.: US 9,681,020 B2
(45) Date of Patent: Jun. 13, 2017

(54) CREATION AND IDENTIFICATION OF UNFORGEABLE PRINTABLE IMAGE INFORMATION DATA

(71) Applicant: Cüneyt Göktekin, Potsdam (DE)

(72) Inventor: Cüneyt Göktekin, Potsdam (DE)

( * ) Notice: Subject to any disclaimer, the term of this patent is extended or adjusted under 35 U.S.C. 154(b) by 0 days.

(21) Appl. No.: 14/783,819

(22) PCT Filed: Apr. 4, 2014

(86) PCT No.: PCT/EP2014/056820
§ 371 (c)(1),
(2) Date: Oct. 9, 2015

(87) PCT Pub. No.: WO2014/166837
PCT Pub. Date: Oct. 16, 2014

(65) Prior Publication Data
US 2016/0072980 A1 Mar. 10, 2016

(30) Foreign Application Priority Data
Apr. 10, 2013 (DE) .................. 10 2013 103 613

(51) Int. Cl.
*H04N 1/32* (2006.01)
*G06T 1/00* (2006.01)

(52) U.S. Cl.
CPC ....... *H04N 1/32309* (2013.01); *G06T 1/0028* (2013.01); *H04N 1/32203* (2013.01); *H04N 1/32325* (2013.01); *G06T 2201/005* (2013.01); *H04N 2201/3236* (2013.01)

(58) Field of Classification Search
None
See application file for complete search history.

(56) References Cited

U.S. PATENT DOCUMENTS

| | | | | |
|---|---|---|---|---|
| 5,315,098 | A * | 5/1994 | Tow | G06K 1/121 235/469 |
| 6,285,775 | B1 * | 9/2001 | Wu | G06T 1/0042 382/100 |
| 6,301,369 | B2 * | 10/2001 | Powell | 382/100 |
| 7,397,584 | B2 * | 7/2008 | Harrington | G06T 1/0028 358/1.18 |
| 7,492,920 | B2 | 2/2009 | Jordan et al. | |
| 8,165,341 | B2 * | 4/2012 | Rhoads | G06K 9/00442 382/100 |

(Continued)

FOREIGN PATENT DOCUMENTS

| | | |
|---|---|---|
| DE | 10211982 A1 | 10/2003 |
| WO | WO 2004/028140 A1 | 4/2004 |

OTHER PUBLICATIONS

Chareyon et al., "Watermarking and authentication of color images based on segmentation of the xyY color space," *Imaging Science and Technology*, 50(5):411-423 (2006).

(Continued)

*Primary Examiner* — Paul F Payer
(74) *Attorney, Agent, or Firm* — Arnold & Porter Kaye Scholer LLP

(57) ABSTRACT

The present application relates to a method for producing and authenticating unforgeable printable image comprising information color values and inference color values. The present application further provides for unforgeable printed images.

24 Claims, 3 Drawing Sheets

(56) References Cited

U.S. PATENT DOCUMENTS

| | | | |
|---|---|---|---|
| 8,650,402 B2* | 2/2014 | Au | G06T 1/0028 358/3.06 |
| 2001/0002213 A1 | 5/2001 | Powell et al. | |
| 2006/0072778 A1* | 4/2006 | Harrington | G06T 1/0028 382/100 |
| 2008/0247002 A1* | 10/2008 | Au | G06T 1/0028 358/3.28 |
| 2012/0243797 A1* | 9/2012 | Di Venuto Dayer | G06K 9/00577 382/218 |

OTHER PUBLICATIONS

Chen et al., "User-Friendly Random-Grid Based Visual Secret Sharing," *IEEE Transaction on Circuits and Systems for Video Technolgy*, 21(11):1693-1703 (2011).

International Search Report issued on Sep. 23, 204, in International Patent Application No. PCT/EP2014/056820.

Oztan et al., "Clustered-Dot Color Halftone Watermarks," *Color and Imaging Conference*, Society for Imaging Science and Technology, pp. 99-104 (2008).

Oztan et al., "Clustered-Dot Color Halftone Watermarks using Spatial Frequency and Color Separability," *IS&T/SPIE Electronic Imaging*, International Society for Optics and Photonics, pp. 1-12 (2010).

Oztan et al., "Pre-separation clustered-dot color halftone watermarks: Separation estimation based on spatial frequency content," *Journal of Electronic Imaging*, 19(4), 43007, pp. 1-12 (2010).

Simske et al., "Revenge of the Physical—Mobile Color Barcode Solutions to Security Challenges," *Proc. Optical Document Security*, S.184-197 (2010).

Surekha et al., "Digital Image Ownership Verification Based on Spatial Correlation of Colors," Image Processing (IPR 2012), IET Conference on IET, pp. 1-5 (2012).

Thomas et al., "Image watermarking based on color quantization process," Electronic Imaging 2007, Int. Society for Optics and Photonics, p. 650603 (2007).

Trémeau et al., "Recent Trends in Color Image Watermarking," *Journal of Imaging Science and Technology*, 53(1):010201-010201-15, (2009).

* cited by examiner

CREATION AND IDENTIFICATION OF UNFORGEABLE PRINTABLE IMAGE INFORMATION DATA

The present invention relates to a method for producing unforgeable printable image information data that may be printed with conventional printers or printing processes, and which may be easily decoded or recognized by means of a camera unit such as a Smartphone, for example.

According to statements by the World Customs Organization (Brussels), the economic impact of counterfeit products placed on the market increases from year to year in the global economy. For this reason, and since, for example, Smartphones are widespread, relatively inexpensive and well-suited for the authentication of codes printed or applied onto a package, for example, suitable processes are increasingly developed and used for this purpose.

AlpVision offers a "Varnish Cryptoglyph®" product on the market for example, which introduces micro-holes as a pseudo-random pattern into a varnish coating that are invisible to the human eye. In this context, the invisible micro-holes are introduced into cartons, blister packs and labels during a printing process. A corresponding authentication is performed by a software application on the Apple iPhone 4 Smartphone. However, the micro-holes can be introduced only with relatively great difficulty, and a special varnish for this purpose is required.

Special labels such as, for example, hologram labels or Guilloche pattern labels, which change the image depending on the viewing angle or become visible only with special screen filters, are expensive to produce and are difficult to handle for the end user. Moreover, forgers increasingly copy standard holograms. Here, too, Smartphone-based solutions are available from InkSure and Jura JSP GmbH, for example.

US 20120243797 A1 discloses a method for applying an image with interference points onto a package, of which an image can be taken with a Smartphone for instantaneous identification. For this purpose the interference points are so small that they are imperceptible to the human eye. Black-and-white or color interference points with relatively high contrasts can be photographed easily and can also be correspondingly printed again easily with a printer.

Treméau, et al., disclose various methods for watermarking in the paper "Recent Trends in Color Image Watermarking" in the *Journal of Imaging Science and Technology*, 2009, Vol. 53(1), 10201 pages 1-15. Treméau, et al., propose to use the colors of an image in quantized steps and according to a predetermined distribution. They also recommend using colors with a small color difference for example, although it is difficult to determine a quality of recognizing the small color differences. In this context, half-tone coloring is also mentioned.

A method for watermarks or for hiding information within an image without being able to identify the message with the eye, was disclosed by Thomas, et al., in the paper "Image Watermarking based on color quantization process" in the publication *Electronic Imaging* 2007, *Int. Society for Optics and Photonics*, 2007, page 650603.

In the paper "Watermarking and authentication of color images based on segmentation of the xyY color space" in *Imaging Science and Technology*, 2006, Vol. 50(5): 411-423, Chareyon, et al., disclose a method for hiding a watermark by changing the color in certain areas according to a pattern.

In the paper "Pre-separation clustered-dot color halftone watermarks: Separation estimation based on spatial frequency content" in the *Journal of Electronic Imaging*, 2010, Vol. 19(4), 43007, page 1-12, Oztan, et al., disclose a method for capturing CMYK prints using a RGB scanner.

In the paper "User-friendly random-grid based visual secret sharing" in the publication *IEEE, Trans. on Circuits and Systems for Video Techn.*, Vol. 21(11), 2011, 1693-1703, Chen, et al., disclose a method for hiding one or two secret images or logos within an image.

In the paper "Digital Image Ownership Verification based on spatial Correlation of Colors" in the publication *Image Processing (IPR* 2012), IET Conference on IET, 2012, page 1-5, Surekha, et al., disclose a method for splitting a watermark into two partial images wherein a first partial image is introduced during printing and a second partial image is used during the recognition of the first partial image, in order to identify the watermark.

In the paper "Revenge of the physical—mobile color barcode solutions to security challenges" in the publication *Proc. Optical Document Security*, 2010, S. 184-197, Simske, et al., disclose a method for the selection of colors for bar codes.

Likewise, methods for the introduction and recognition of watermarks hidden for the eye are presented in the documents WO2004028140 A1, US20080247002 A1 and U.S. Pat. No. 5,315,098 A.

In addition, solutions exist which offer very large copy protection but require special equipment and varnishes, wherein the corresponding printing methods are very expensive and are therefore unsuitable for many applications. Numerous copy protection features are frequently introduced on banknotes for identification for example, which make it impossible in particular for end-users to identify all of them. Using smart phones, such features may be stored as patterns and be compared with the respective pattern, however.

SUMMARY OF THE INVENTION

An object of the present invention is to eliminate the disadvantages from the cited references by providing a method for producing unforgeable printable information data, which may be printed onto paper, carton or the like using standard printing methods, and which may be imperceptible to the human eye but may be nevertheless identifiable with a camera unit, such as a camera-based Smartphone.

The problems described above in connection with the cited references, and further problems raised throughout the specification may be resolved by a method for producing an unforgeable printable image and by a method for recognizing and authenticating the unforgeable image information data according to the features of the independent claim 1 or 18. Further advantageous embodiments of the present invention are disclosed in the dependent claims presented herein.

The advantages achieved by the present invention include that the unforgeable information data may be printed on paper, carton or the like using conventional printing methods or printing devices. The production or the printing of the unforgeable information data on papers, carton or packaging requires almost no adaptation, in contrast to other methods disclosed in the cited references. The unforgeable information data may also be integrated into a predetermined design or applied onto existing packaging or labels.

In particular, because the information fields (Ixy) (and the information pixels therein) that may be generated from predetermined information data may be printed in first grid areas (R1) and preferably encoded to have only slightly differing color values (FW), such color values may not be recognized nor distinguished from one another with the naked eye. Preferably, the color values assigned to implement the encoding may be so weakly contrasted that they may barely, or at least not securely, be distinguishable, even under a microscope.

Another aggravating factor for attempted forgery is that, in addition to the information pixels in the information fields (Ixy), interference pixels may also be arranged in adjacent interference fields (Sxy). As a result, visual perception by a microscope or a camera or scanner-based detection of the information pixels may be further complicated. For this purpose, the interference color values assigned to the interference fields (Sxy) and information color values assigned to the information fields (Ixy) may be determined such that they may only be slightly different or contrasted when printed and may be differentiated or distinguished only with great difficulty. Successfully producing a forgery may be significantly complicated in that the difference in color values between interference pixels adjacent to information pixels may be so small that such color values may be recognized and distinguished only by a camera unit with specific software. Moreover, every printing device produces device-specific black-and-white prints or color prints that may be slightly different from those of other printing devices.

By initially generating the unforgeable printable image containing embedded printable information data which may be printed by a printing device and may be recognized and authenticated subsequently, it may be possible to evaluate the device-specific printed color values of the printed information data for subsequent authentication or decoding. Therefore, it may also be possible to use one or multiple device-specific print values of predetermined approved printing devices virtually as fingerprints for the authentication or decoding. In this context, the measured color values or a relative contrast distribution of the printed color values may be transmitted via the Internet to a camera unit (or Smartphone) for evaluation or authentication. The contrasts between the information color values and interference color values may preferably be as small as possible and just different enough to be reliably distinguished for authentication by a camera unit (or Smartphone). This makes the unforgeable printable image even more unforgeable.

During the recognition and authentication of the printed information data by a camera unit (or Smartphone), an Internet connection may not be necessary if the required decoding data for authentication of the information data have been previously downloaded. As a result, authentication may be possible in real-time, that is, a camera unit (or Smartphone) may perform and display the authentication instantaneously.

A further advantage of the present invention is that it may be used easily and cost-effectively by end-users. It may be used in a number of bar/QR code applications on Smartphones, and operation of the present invention requires no special knowledge. The installation and updating of recognition software on a camera unit (or Smartphone) may be done, for example, via the Apple App Store, the Google Play store or suchlike.

By implementing simple and easily permutable encoding (including interference pixel encoding), and due to the simplicity of transmitting to a camera unit (or Smartphone) the decoding data required for authentication, the encoding of the unforgeable printable image containing embedded printable information data may be modified with very little effort and at predetermined time intervals.

Preferred embodiments according to the present invention may be illustrated in the subsequent drawings and in a detailed description, but such embodiments are not intended to limit the present invention thereto.

The drawings show:

Figure 5:
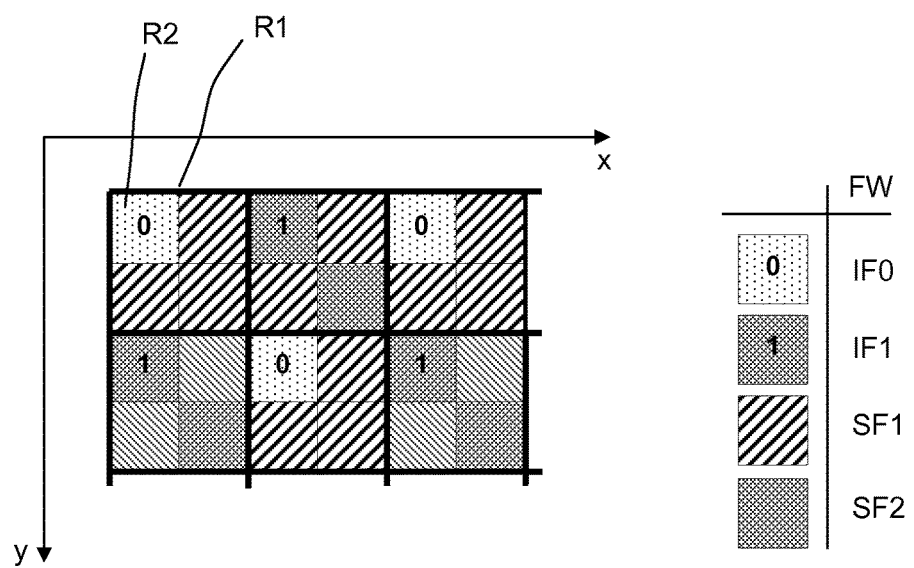
Figure 6:
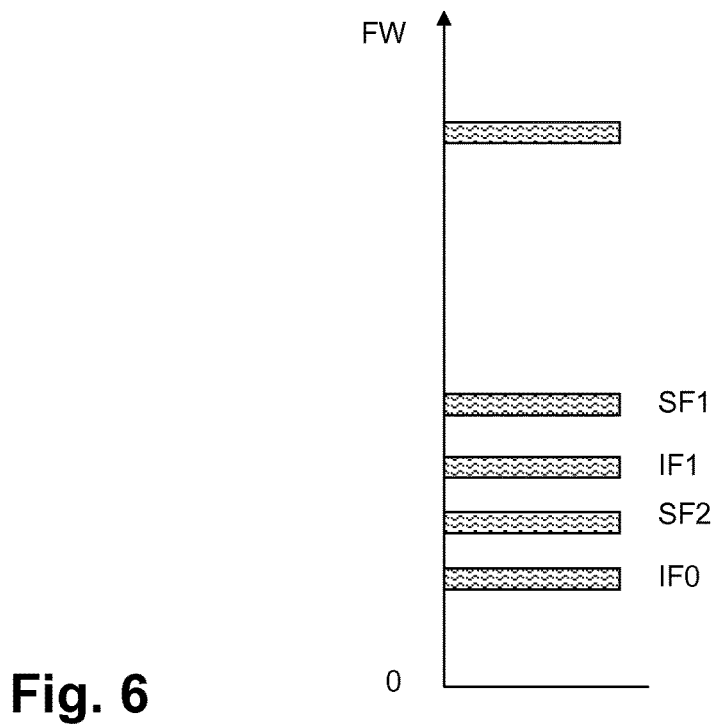

FIG. 5 is a schematic representation of a portion of an image area (R0) with corresponding first grid areas (R1) and second grid areas (R2), wherein the second grid areas (R2) may be filled with respective color values (FW), wherein a first information color value (IF1) may have a binary value of 1 (one), and a second information color value (IF0) may have a binary value of 0 (zero); and SF1 may be the first interference color value and SF2 may be the second interference color value; and FIG. 6 is a diagram with a scale of color values in which information color values (IF1 and IF0) and interference color values (SF1 and SF2) are plotted.

DETAILED DESCRIPTION OF PREFERRED EMBODIMENTS

The objective of the methods according to the present disclosure is to initially generate an unforgeable printable image containing embedded printable information data derived from predetermined information data, print such information data on paper, carton or packaging, and recognize and authenticate such printed information data.

For this purpose, the predetermined information data may be converted into an array of binary information fields (Ixy), which occurs by encoding the predetermined information data into binary information fields (Ixy) using a predetermined encoding rule. The generated binary information fields (Ixy) may be arranged within an image area (R0), which may be subdivided into first grid areas (R1). The image area (R0) may comprise a unidimensional or two-dimensional grid, such as a line barcode or a matrix barcode, for example. Three-dimensional grids may be also conceivable and would require three-dimensional printers for printing.

According to the present disclosure, the first grid areas (R1) may be subdivided so that a plurality of second grid areas (R2) may be formed in each respective first grid area (R1). In this context, a plurality is at least two or more. Preferably, the subdivided second grid areas (R2) may be in the form of a checkerboard, bar-shaped or pie segments, but other forms of partitioning may be also possible.

According to an information field assignment rule, one of the second grid areas (R2) in a first grid area (R1) may be assigned as an information field (Ixy). At the same time, according to the same information field assignment rule, the remaining second grid areas (R2) of the respective first grid area (R1) may be assigned as interference fields (Sxy).

According to the binary values of 1 (one) or 0 (zero) of each information field (Ixy), a first information color value (IF1) may be assigned to information fields (Ixy) with a binary value of 1, and a second information color value (IF0) may be assigned to information fields (Ixy) with a binary value of 0. Such color value assignment may be performed according to an information color value assignment rule. The second information color value (IF0) and the first information color value (IF1) have different color values.

According to an interference color value assignment rule, predetermined interference color values (SF1 or SF2) may be assigned to interference fields (Sxy). This may be intended to encumber subsequent detection of and differentiation between information fields (Ixy) and interference fields (Sxy), and accordingly, detection of the first information color value (IF1) and the second information color value (IF0).

The color values of the second grid areas (R2) assigned a first information color value (IF1), a second information color value (IF0), or interference color values (SF1 and SF2) may ultimately be stored as the printable information data and preferably provided for printing onto paper, carton or packaging.

Figure 1:
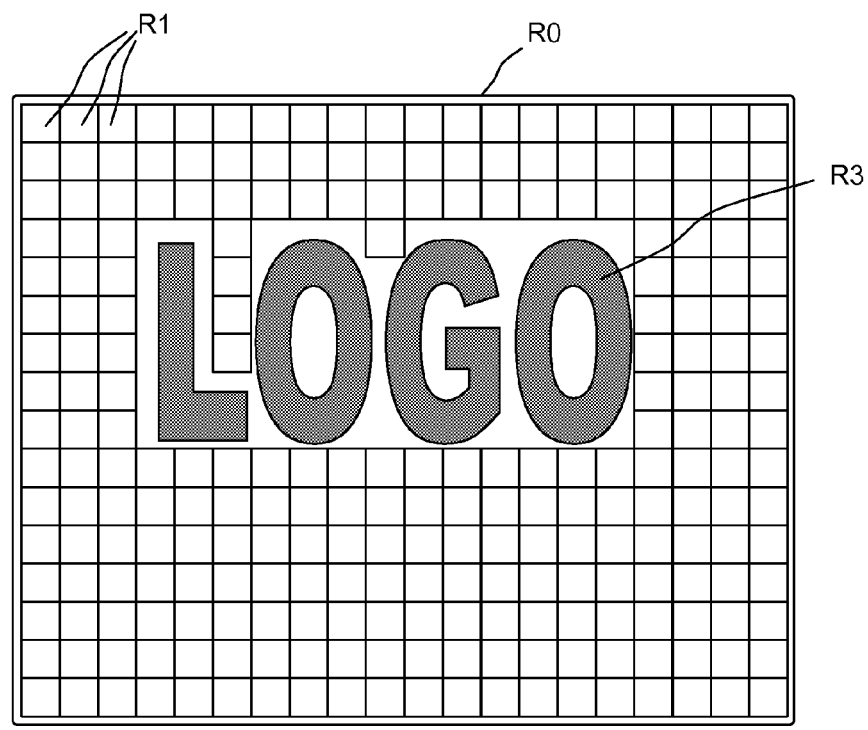
FIG. 1 shows an image area with an image area (R0) with corresponding first grid areas (R1), and a logo area (R3) positioned therein.

FIG. 1 shows an example of an image area (R0), which may be subdivided into first grid areas (R1). Preferably, a logo area (R3) may also be arranged within the image area (R0). The logo area (R3) may be preferably arranged within the image area (R0) such that the logo area (R3) is surrounded partially or completely by the first grid areas (R1). Preferably, the first grid areas (R1) may be separate from the logo area (R3), so that they do not overlap. It may be also possible, however, that a logo and/or other characters may be depicted by interference fields (Sxy).

Figure 2:
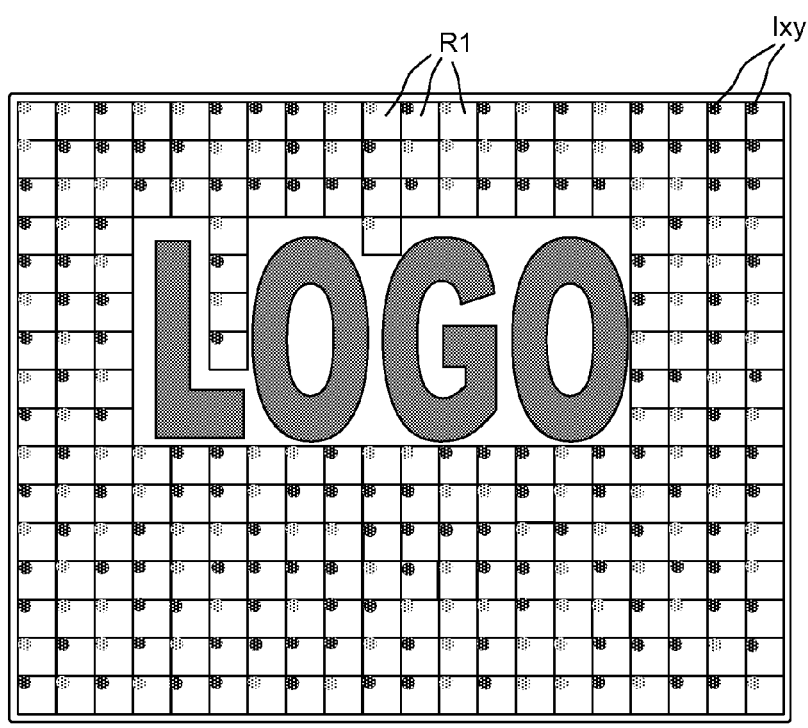
FIG. 2 shows an image area (R0), wherein the respective first grid areas (R1) may contain image information fields (Ixy)
Figure 3:
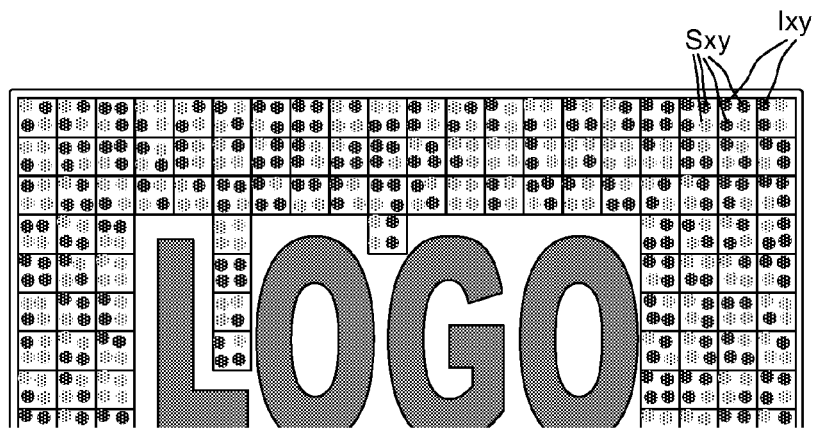
FIG. 3 shows an upper half of the image area (R0) with corresponding first grid areas (R1) illustrated in FIG. 2, wherein the each first grid area (R1) may be composed of respective second grid areas (R2) (second grid areas (R2) not outlined in this figure), each of which may be populated by information fields (Ixy) and interference fields (Sxy)

The first grid areas (R1) may be subdivided into second grid areas (R2). In the present example, four second grid areas (R2) arranged in the form of a checkerboard may be generated per each first grid area (R1). In FIG. 1-3, the second grid areas (R2) are not outlined, as they are, for example, in FIG. 4 and FIG. 5, however. In the present example, the upper left second grid area (R2) of each first grid area (R1) may be assigned as an information field (Ixy), and the remaining three second grid areas (R2) may be assigned as interference fields (Sxy).

FIG. 2 shows an image area (R0), wherein information pixels may populate information fields (Ixy), and wherein said information pixels may be represented either by a lighter or comparatively darker shade.

FIG. 3 shows the upper half of the image area (R0) from FIG. 2, but including the interference pixels that populate the interference fields (Sxy). The interference pixels may preferably be generated with a color value that differs only slightly from the color values of the information pixels. The color values of the interference pixels may preferably also be highly contrasted relative to the information pixels however, in order to cover or drown out the information pixels in terms of color. The interference pixels may thus be produced in color and arranged around the information pixels so as to produce much interference, thereby making the information pixels more difficult to detect.

Figure 4:
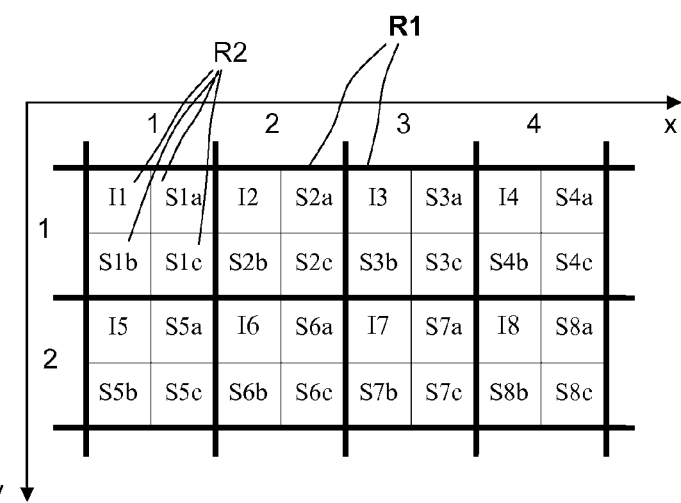
FIG. 4 is a schematic representation of a portion of an image area (R0) with corresponding first grid areas (R1) (marked with thick lines in this figure) and may be subdivided into second grid areas (R2), wherein each such second grid area (R2) may be populated by an image information field (Ixy) (labeled I1-I8 in this figure) and interference fields (Sxy) (labeled S1a-c-S8a-c in this figure)

FIG. 4 shows a schematic representation of a preferred configuration of the first grid areas (R1), which are marked with bold outlines, and of second grid areas (R2), which are marked with thin outlines. The second grid areas (R2) of a respective first grid area (R1) may be assigned as an information field (Ixy), labeled in FIG. 4 as I1-I8, and the remaining second grid areas (R2) as interference fields (Sxy), labeled in FIG. 4 as S1a-c-S8a-c. The information fields (Ixy) and interference fields (Sxy) may be identified in the form of a matrix across a X-coordinate and a Y-coordinate. Other configurations or partitions, such as in the form of pie segments, for example, are also conceivable in principle.

FIG. 5 shows an exemplary illustration of information fields (Ixy) and interference fields (Sxy) filled with their corresponding color values. For information fields (Ixy) with a binary value of 1, a first information color value (IF1) may be assigned to such respective information fields (Ixy), and for information fields (Ixy) with a binary value of 0, a second information color value (IF0) may be assigned, wherein such assignments occur according to an information color value assignment rule. According to an interference color value assignment rule, interference color values may be assigned to the interference fields (Sxy). In the present example, either a first interference color value (SF1) or a second interference color value (SF2) may be assigned to each interference field (Sxy) in the following manner. The first interference color value (SF1) and the second interference color value (SF2) may be assigned such that the sum of the color values of the information field (Ixy) and all the interference fields (Sxy) within each first grid area (R1) may be the same across all first grid areas (R1). In other words, for an information field (Ixy) with a smaller information color value (IF0), the three interference fields (Sxy) may be assigned interference color values (SF1 and/or SF2), the sum of which may be relatively large; and for an information field (Ixy) with a larger information color value (IF1), the three interference fields (Sxy) may be assigned interference color values (SF1 and/or SF2), the sum of which may be relatively small.

The color values may be defined based on a color to be printed, which includes a predetermined color or color composition and a predetermined color density. The colors or color values may be mostly produced as color rasters onto which color pixels may be applied. The color raster may be produced from a composition of primary colors, which may be applied or printed with more or less density, depending on the desired color value. The color values may be composed of printing inks like red, green, blue, yellow and black, for example. A lighter color may be produced by printing less dense color pixels, whereas a darker color may be produced by printing denser color pixels.

As used herein, the terms "color value" and "color" may be regarded as being synonymous, wherein a color value may be produced by a color raster. It may also be conceivable that different color values may be produced by different liquid colorants, however. More preferably, the respective color value may be produced as a color pixel raster or as a color pixel distribution with a particular field density, however.

Preferably, all color values, such as the first information color value (IF1), the second information color value (IF0) and the interference color values (SF1 and SF2), may be printed with a conventional printing device. Printers may be designed to produce the requisite color values from their printing inks, such as for example for a print run or half-tone printing, or also for black-and-white printing, color laser printing or ink-jet printing.

Preferably, the first information color value (IF1), the second information color value (IF0) and, more generally, the size of the information fields (Ixy) may be determined such that each information pixel may not be perceptible to the naked eye. The first information color value (IF1) and the second information color value (IF0) may be defined such that the information field (Ixy) may be populated with an information pixel that covers less than 25% of the area of the respective first grid area (R1). A preferred color may be yellow, for example, which is particularly difficult to detect with the human eye. Preferably, a size of 0.01-0.1 mm$^2$ or a diameter size of 0.11-0.36 mm may be defined for second grid areas (R2), and in particular for information fields (Ixy). Consequently, first grid areas (R1) may preferably be four times the size of the second grid areas (R2). Thus, the printed information pixels may not only be small, but also sparsely distributed, and may be recognized with the human eye only under a microscope. The color differentiation between the first information color value (IF1) and the second information color value (IF0) may be sufficiently small so that it may not be perceived by the human eye under a microscope.

According to the information field assignment rule, each information field (Ixy) may preferably be arranged at the same location within each respective first grid area (R1), or in other words, in the same second grid area (R2) of each respective first grid area (R1). Alternatively, according to the information field assignment rule, information fields (Ixy) may also be arranged in varying second grid areas (R2) of adjacent first grid areas (R1).

Preferably, interference color values (SF1 and SF2) may be assigned by the interference color assignment rule to respective interference fields (Sxy), such that a predetermined mean color value in a first grid area (R1) may be achieved by taking the average across color values of the information fields (Ixy) and interference fields (Sxy) therein.

The mean color values of the first grid areas (R1) may preferably be defined as either a first or a second mean color value. Such mean color values may be defined such that the mean color values of adjacent first grid areas (R1) alternate between the defined first and/or second mean color values in a checkered pattern across said adjacent first grid areas (R1). To this end, defining a plurality of mean color values may also be conceivable. In this manner, adjacent first grid areas (R1) may be better distinguished from each other.

Preferably, the mean color values of each first grid area (R1) may be defined such that a second predetermined information may be encoded and transmitted by means thereof. Such second predetermined information may be a readable information, for example. Such second predetermined information may also be a print date and/or an indication regarding a print batch or a printing device, for example. Alternatively, such second predetermined information may also be placed outside of the image area (R0) or as part of the logo area (R3).

Preferably, the mean color values of the first grid areas (R1) may be defined as at least one first or one second mean color value such that the defined first mean color value corresponds to the first information color value (IF1) and the defined second mean color value corresponds to the second information color value (IF0).

The interference color values (SF1 or SF2) may be preferably determined such that they have less than 25% contrast difference to the first information color value (IF1). More preferably, the contrast difference may be less than 5%.

Preferably, the plurality of second grid areas (R2) in each first grid area (R1) may be greater than or equal to three, forming at least two interference fields (Sxy) next to at least one information field (Ixy). As an illustrative example, in the event that a first information color value (IF1) is assigned to an information field (Ixy) within a particular first grid area (R1), a first interference color value (SF1) may be assigned to an interference field (Sxy) within such first grid area (R1), wherein said first interference color value (SF1) may be greater than the first information color value (IF1); and a second interference color value (SF2) may be assigned to another interference field (Sxy) within such first grid area (R1), wherein said second interference color value (SF2) may be less than the first information color value (IF1).

Preferably, the first interference color value (SF1) may be defined at a value that exceeds the first information color value (IF1) only to such an extent as to barely permit reliable recognition by a camera unit. Preferably, the second interference color value (SF2) may be defined at a value that falls below the first information color value (IF1) only to such an extent as to barely permit reliable recognition by a camera unit.

Preferably, each first grid area (R1) may contain four or nine second grid areas (R2) therein. Other subdivision varieties are also possible, however.

Preferably, by using the interference color value assignment rule, a second predetermined information or a further predetermined information may be embedded within the image area (R0) by means of the corresponding interference fields (Sxy).

A second predetermined information may also be used for encrypted encoding of the predetermined information data. As a result, the encoding rule may be changed permutationally, for example.

Preferably, a logo, one or multiple graphic characters and/or an image may be depicted by a second predetermined information. A second predetermined information may also comprise a print batch number, a printing device identifier and/or a print date. Alternatively, a second predetermined information may be printed on the edge of the image area (R0) or within the logo area (R3).

The second predetermined information preferably comprises color values originating from the measured color values of a print of the second predetermined information that was printed by a printing device. In this manner, printing device-specific color values may be measured and transmitted to a camera unit (or Smartphone) for facilitating authentication and decoding.

Preferably, the interference color value assignment rule may display or implement the second predetermined information by means of the interference fields (Sxy). In this context, the second predetermined information may be determined by a function that depends on the predetermined information data. Preferably, such function may be an algorithm, a function for establishing a checksum, a sign change, a quadrature or another function of the predetermined information data.

Preferably, the encoding of predetermined information data into the form of an array of binary information data may be performed, for example, as binary unidimensional or two-dimensional barcode, alphabetic character text or numerical text.

Preferably, the predetermined information data may comprise a serial number and/or product data. Preferably, the serial number and/or product data may also be encoded and embedded in the second predetermined information.

The encoded information data may be printed on all printable materials, such as, for example, paper, carton, packaging and the like.

Decoding—Authentication

Automatic recognition and differentiation of information color values may be performed only with great uncertainties, in that the first information color value (IF1) and the second information color value (IF0) may be defined as having small differences in color value or contrast. Preferably, the first information color value (IF1) and the second information color value (IF0) may be defined as particular percentiles of defined interference color values (SF1 or SF2) with sufficiently high color density, thereby facilitating the secure determination of information color values (IF1 or IF0). In this context, then the first information color value (IF1) may be defined as 20% of the defined interference color value and the second information color value (IF0) may be defined as 17% of the defined interference color value (Sxy), for example. Authentication may thereby be securely performed by knowing these percentages.

A method according to the present disclosure for recognizing and decoding information data in an image area (R0), which has been printed onto paper, carton, packaging boxes, adhesive labels or the like as described above, involves the following steps. Recognition and decoding may be performed by a microcontroller-supported camera unit, a camera or a scanner in conjunction with a PC, a Smartphone or suchlike, which may collectively be referred to as a camera unit hereafter.

Initially, a camera unit may be preferably aligned with a printed image area (R0) by using at least one easily visible and recognizable mark located in or at the printed image area (R0). A predetermined logo with a high-contrast colored bordering may function as such a mark, for example. After the camera unit is aligned, it may capture and store the printed image. Preferably, recognition algorithms may be used for the alignment of the camera unit with the printed image area (R0), wherein such algorithms may detect and indicate in real time whether and how the camera unit may be and/or should be aligned. Preferably, upon automatic detection of and sufficient satisfactory alignment with the image area (R0), the printed image may be captured automatically by the camera unit. The printed image includes the image area (R0) and the printed information data embedded therein.

A pattern recognition algorithm may be run on the printed image, said pattern recognition algorithm being designed to recognize first grid areas (R1) and second grid areas (R2). Preferably, the printed image may be correctly aligned, rotated, rectified and cropped around the image area (R0) before running the pattern recognition algorithm. Preferably, the pattern recognition algorithm may conduct a comparison against a predetermined pattern. For the recognition of first grid areas (R1) and second grid areas (R2), preferably a histogram analysis may be performed, which would display the rows and columns of the grid areas.

By applying the information field assignment rule, information fields (Ixy) and interference fields (Sxy) may be determined from the detected second grid areas (R2).

The information color values (IF1 and IF0) of information fields (Ixy) may be subsequently determined by means of a further histogram analysis of the color values. Preferably, during such histogram analysis, two color values with respectively significant accumulation may be measured and determined as the first information color value (IF1) and the second information color value (IF0).

Such histogram analysis for the recognition and differentiation of information color values (IF1 and IF0) may be preferably designed such that, after a first information color value (IF1) is approximately recognized, existing color values in the vicinity of said first information color value (IF1) may be analyzed and distinguished with higher resolution. Thereby, the first information color value (IF1) and the second information color value (IF0) and the interference color values (SF1 or SF2) may be distinguished from one another. In this manner, a first information color value (IF1) may be distinguished from adjacent interference color values (SF1 or SF2), as a result of which the first information color value (IF1) and the adjacent interference color values (SF1 and SF2) may be recognized.

According to the information color value assignment rule, the binary value of 1 (one) may be assigned to the information fields (Ixy) with a first information color value (IF1), and the binary value of 0 (zero) may be assigned to the information fields (Ixy) with the second information color value (IF0). Thereby, binary information data may be produced from the information color values assigned to the information fields (Ixy).

Thereafter, a decoding rule, which corresponds to the encoding rule, may be applied to said binary information data, and the predetermined information data may be recovered therefrom. If the recovered information data correspond with the predetermined information data, which may be either stored or may be accessed via the Internet, then the authenticity of the recovered information data may be directly or indirectly displayed by a camera unit. Otherwise, notification of a forgery may be displayed. Preferably, at and above a predetermined degree of correlation, it may be assumed that the recovered information data conform with the predetermined information data so that individual deviating pixels do not produce a false-negative result.

Preferably, the pattern recognition algorithm may be designed to initially recognize first grid areas (R1) as a checkered pattern by means of low-pass filtering, whereupon edges of a low-pass filtered pattern may be determined, and therewith, first grid areas (R1) may be determined.

Preferably, the mean color values of each first grid area (R1) may be determined, wherein at least two significant distinguishable mean color values may be recognizable by a further histogram analysis, and wherein an evaluation of the mean color values may also be considered for authentication of the printed information data.

Preferably, and if applicable, for authentication of the information data, a second information embedded by means of the interference fields (Sxy) may be compared with a database to determine whether the information data and, if applicable, the second information is admissible or not. Preferably, such database may be available via a memory area or a memory value in a camera unit or by data that may be accessible via the Internet, for example.

Preferably, the decoding and recognition algorithms may be designed so that they may distinguish a first information color value (IF1) and a second information color value (IF0) from one another securely by means of a histogram analysis, in that according to the information color value assignment rule known to the camera unit, the corresponding binary values of the larger color value and the smaller color value may be assigned to the corresponding information fields (Ixy).

Preferably, the decoding and recognition algorithms may also be designed such that they distinguish a first interference color value (SF1) and a second interference color value (SF2) from one another securely by means of a histogram analysis, in that the corresponding color values may be distinguished and assigned to the corresponding interference fields (Sxy) according to the interference color value assignment rule known to the camera unit.

Preferably, the recognition and decoding of the printed image information data also include the following steps:

applying the function used for producing the unforgeable printed information data to produce the second predetermined information, with the predetermined information data as the dependent variable of said function, in order to obtain a calculated second information therefrom;

recognizing a second predetermined information embedded in the interference fields (Sxy) according to the information field assignment rule; and comparing the calculated second information and the recognized second information, wherein authentication of said second predetermined information may be performed by means of correlation, and in the event of a deviation between the calculated second information and the detected second predetermined information, such authentication may be rejected.

It should be noted that an interference pixel may be understood as an interference field (Sxy) with an interference color value (SF1 or SF2), and an information pixel may be understood as an information field (Ixy) with an information color value (IF1 or IF0).

Further possible embodiments may be described in the following claims. In particular, the different features of the embodiments described above may also be combined with each another, unless they conflict in terms of technology.

The reference numbers cited in the claims serve for improved comprehensibility but they do not limit the claims to the forms illustrated in the figures.

LIST OF REFERENCE SYMBOLS

FW color value
Ixy information field
Sxy interference field
IF1 first information color value
IF0 second information color value
SF1 first interference color value
SF2 second interference color value
R0 image area
R1 first grid area
R2 second grid area
R3 logo area
X, Y coordinates

The invention claimed is:

1. A method for generating an unforgeable printable image containing embedded printable information data, comprising:

encoding predetermined information as an array of information fields (Ixy), wherein each information field (Ixy) is assigned a binary value of 1 (one) or a value of 0 (zero), according to an encoding rule;

defining an image area (R0) comprising a stored printable image or a portion thereof;

dividing said image area (R0) to form a plurality of first regions (R1) within image area (R0);

subdividing each of said first regions (R1) to form a plurality of second regions (R2) within each first region (R1);

assigning, according to a field assignment rule, each of said information fields (Ixy) to at least one of said second regions (R2) within each of said first regions (R1), and an interference field (Sxy) to the remaining second regions (R2) within each of said first regions (R1);

assigning, according to an information color value assignment rule, a first information color value (IF1) to information fields (Ixy) assigned a value of 1 (one) by said encoding rule, and a second information color value (IF0) to information fields (Ixy) assigned a value of 0 (zero) by said encoding rule;

assigning, according to an interference color value assignment rule, a first interference color value (SF1) or a second interference color value (SF2) to said interference fields (Sxy); and storing said unforgeable printable image containing embedded printable information data, comprising
said stored printable image;
said image area (R0);
said first regions (R1); and
said second regions (R2) having said assigned first information color values (IF1), second information color values (IF0), first interference color values (SF1) or said second interference color values (SF2).

2. The method according to claim 1, wherein the size of said information fields (Ixy) is determined such that, when printed, said information color values (IF1 and IF0) are imperceptible to the naked eye.

3. The method according to claim 2, wherein
said information color values (IF1 and IF0) fill less than 25% of each of said first regions (R1);
said second region (R2) has the size of 0.01-0.1 mm$^2$; and
the surface area of said first region (R1) is at least four times the surface area of said second region (R2).

4. The method according to claim 1, wherein said information field (Ixy) in each first region (R1) is assigned to said second region area (R2) in the same relative position across all first regions (R1), or to said second regions (R2) in alternating positions within adjacent first regions (R1).

5. The method according to claim 1, wherein a predetermined mean color value is set, and said interference color values (SF1 or SF2) for said interference fields (Sxy) within each of said first regions (R1) are determined such that the mean color value of the color values of said information field (Ixy) and said interference fields (Sxy) within each of said first regions (R1) is equal to said predetermined mean color value.

6. The method according to claim 5, wherein said predetermined mean color values of said first regions (R1) are defined as at least a first or a second predetermined mean color value, and said first or second predetermined mean color values are arranged in alternating positions across adjacent first regions (R1).

7. The method according to claim 6, wherein said first and second predetermined mean color values are defined such that an additional second predetermined information is encoded therein.

8. The method according to claim 7, wherein said second predetermined information is used for an encrypted encoding of said predetermined information into the form of an array of information pixels assigned the binary values of 1 (one) or 0 (zero).

9. The method according to claim 7, further comprising determining said second predetermined information by a function that depends on said predetermined information, wherein said function is a checksum, an inversion, a quadrature or another such function of said predetermined information.

10. The method according to claim 6, wherein said first predetermined mean color value corresponds to said first information color value (IF1) and said second predetermined mean color value corresponds to said second information color value (IF0).

11. The method according to claim 7,
wherein said second predetermined information depicts a logo, graphic character or image, or
wherein said second predetermined information identifies a print date, print batch or printing device.

12. The method according to claim 1, wherein said interference color values (SF1 or SF2) assigned to a first region (R1) are defined such that each interference color value has less than a 25% contrast difference from said first information color value (IF1).

13. The method according to claim 1, wherein the number of said second regions (R2) within each first region (R1) is greater than or equal to three, wherein each of said first regions (R1) contains at least two interference fields (Sxy) and one information field (Ixy).

14. The method according to claim 13, wherein said interference color values (SF1 and SF2) are determined at values that differ from said first information color value (IF1) only to such an extent as to barely permit reliable recognition of said color values by a microcontroller-supported camera.

15. The method according to claim 1, wherein a second predetermined information is embedded into said predetermined information by means of assigning corresponding interference color values (SF1 and SF2) to said interference fields (Sxy) according to said interference color value assignment rule.

16. The method according to claim 1, wherein said interference color value assignment rule is designed to embed a second predetermined information within said interference fields (Sxy).

17. The method according to claim 1, wherein a print date or a print batch is encoded and embedded within or on the border of said predetermined information, thereby encoding and embedding printed and measured color values for use in decoding and authentication of said unforgeable printable image.

18. The method according to claim 1, further comprising printing said unforgeable printable image containing embedded printable information data.

19. A method for decoding a stored unforgeable printable image containing embedded printable information data and authenticating predetermined information therefrom, comprising:
running a pattern recognition algorithm on said stored unforgeable printable image containing embedded printable information data, wherein said pattern recognition algorithm is designed to recognize
an image area (R0);
a plurality of first regions (R1) within image area (R0); and
a plurality of second regions (R2) within each first region (R1);
identifying, by means of a field assignment rule, each of said second regions (R2) as an information field (Ixy) or as an interference field (Sxy), wherein each information field (Ixy) and each interference field (Sxy) has a color value;
conducting a histogram analysis of the color values of said identified information fields (Ixy), thereby determining a first information color value (IF1) and a second information color value (IF0);
assigning, according to an information color value assignment rule, a binary value of 1 (one) to each information field (Ixy) having said first information color value (IF1) and a binary value of 0 (zero) to each information field (Ixy) having said second information color value (IF0); and
decoding, according to a decoding rule, said information fields (Ixy) with assigned binary values 1 (one) or 0 (zero), and authenticating said predetermined information therefrom.

20. The method according to claim 19,
wherein said pattern recognition algorithm detects said first regions (R1) by means of low-pass filtering, wherein said low-pass filtering is designed to detect the borders of said first regions (R1);
wherein said histogram analysis of the color values of said identified information fields (Ixy) performed in areas wherein said first information color value (IF1) is greater than said second information color value (IF0) is performed with higher resolution than in other color value areas; and
wherein said histogram analysis of said identified information fields (Ixy) considers a predetermined minimum or maximum color value separation.

21. The method according to claim 19, wherein mean color values of each of said first regions (R1) are defined and at least two significant distinguishable mean color values are recognizable by a further histogram analysis, wherein said mean color values are evaluated for the purposes of authenticating said predetermined information.

22. The method according to claim 19, wherein said predetermined information and said second predetermined information are compared with a database to determine for the purposes of authentication whether said predetermined information and said second predetermined information are authentic.

23. The method according to claim 19, further comprising:
applying a known function to said predetermined information to generate a second predetermined information, wherein said second predetermined information depends on said predetermined information;
calculating said second predetermined information from said predetermined information by applying said known function;
detecting a second predetermined information from said interference fields (Sxy) according to said interference color value assignment rule; and
comparing the calculated second predetermined information and the detected second predetermined information, wherein authentication of said second predetermined information is successful in the event of agreement between said calculated second predetermined information and said detected second predetermined information, and successful in the event of deviation between said calculated second predetermined information and said detected second predetermined information.

24. The method according to claim 19, further comprising:
aligning a microcontroller-supported camera with a printed image unforgeable printable image containing embedded printable information data;
capturing said printed image containing embedded printable information data with said microcontroller-supported camera; and
storing said image containing embedded printable information data.

* * * * *